(12) United States Patent
Dawkins et al.

(10) Patent No.: US 9,798,615 B2
(45) Date of Patent: Oct. 24, 2017

(54) SYSTEM AND METHOD FOR PROVIDING A RAID PLUS COPY MODEL FOR A STORAGE NETWORK

(75) Inventors: William P. Dawkins, Austin, TX (US); Jacob Cherian, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 373 days.

(21) Appl. No.: 13/089,710

(22) Filed: Jul. 5, 2011

(65) Prior Publication Data

US 2013/0013857 A1 Jan. 10, 2013

(51) Int. Cl.
G06F 12/02 (2006.01)
G06F 11/10 (2006.01)
G06F 11/20 (2006.01)

(52) U.S. Cl.
CPC ...... *G06F 11/1076* (2013.01); *G06F 11/2071* (2013.01); *G06F 11/2094* (2013.01); *G06F 2211/1028* (2013.01)

(58) Field of Classification Search
None
See application file for complete search history.

(56) References Cited

U.S. PATENT DOCUMENTS

| | | | |
|---|---|---|---|
| 6,473,867 B2 | 10/2002 | Yamamoto et al. | |
| 7,076,606 B2 | 7/2006 | Orsley | |
| 7,340,672 B2 | 3/2008 | Goldschmidt et al. | |
| 7,478,275 B1 * | 1/2009 | Deolasee et al. | 714/13 |
| 7,512,862 B1 * | 3/2009 | Taylor | G06F 11/1076 702/189 |
| 7,783,716 B2 | 8/2010 | Hayward | |
| 8,209,587 B1 * | 6/2012 | Taylor | G06F 11/1088 711/114 |
| 8,929,369 B1 * | 1/2015 | Shain | H04L 12/185 370/390 |
| 2006/0031287 A1 * | 2/2006 | Ulrich et al. | 709/203 |
| 2006/0218360 A1 * | 9/2006 | Burkey | 711/154 |
| 2008/0270461 A1 * | 10/2008 | Gordon et al. | 707/103 R |
| 2009/0077370 A1 * | 3/2009 | Barabash et al. | 713/100 |
| 2009/0204757 A1 | 8/2009 | Edwards, III et al. | |
| 2011/0082997 A1 * | 4/2011 | Yochai et al. | 711/171 |
| 2012/0290905 A1 * | 11/2012 | Krishnamurthy | 714/800 |

* cited by examiner

*Primary Examiner* — Charles Rones
*Assistant Examiner* — Ryan Dare
(74) *Attorney, Agent, or Firm* — Larson Newman, LLP

(57) ABSTRACT

A storage system includes a storage server adapted to receive data, determine parity data based upon the data, and store the data and the parity data in a storage array associated with the storage server. The data and the parity data may be sent to a second storage server.

15 Claims, 2 Drawing Sheets

SYSTEM AND METHOD FOR PROVIDING A RAID PLUS COPY MODEL FOR A STORAGE NETWORK

FIELD OF THE DISCLOSURE

This disclosure relates generally to information handling systems, and relates more particularly to providing storage in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
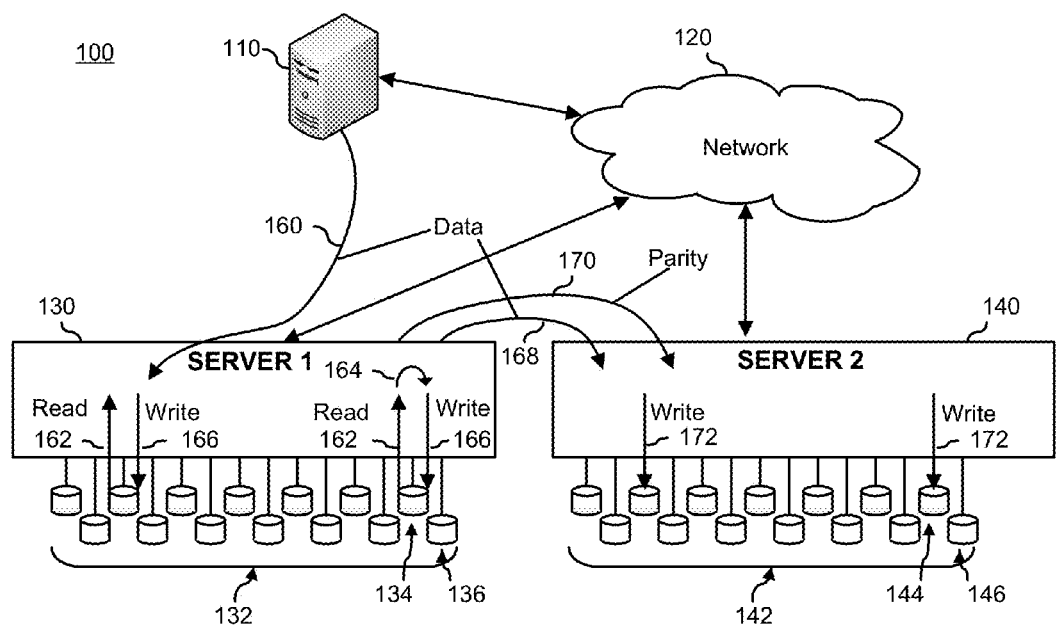
FIG. 1 is a functional block diagram illustrating an embodiment of a storage network according to the present disclosure.

FIG. 1 illustrates an embodiment of a storage network 100, including one or more information handling systems 110, a network fabric 120, and storage servers 130 and 140. Information handling system 110 and storage servers 130 and 140 are connected to network fabric 120, and communicate data over the fabric. Storage servers 130 and 140 provide data storage and retrieval capacity for information handling system 110. Storage server 130 includes a storage array 132, and storage server 140 includes a storage array 142. Array 132 includes multiple storage devices for storing data for information handling system 110, one or more parity data storage devices 134, and one or more hot spare storage devices 136. Similarly, array 142 includes multiple storage devices, one or more parity data storage devices 144, and one or more hot spare storage devices 146.

In a particular embodiment, the storage devices include disk drives such as Serial-ATA disk drives, SCSI disk drives, other types of disk drives, solid state memory devices, tape backup storage devices, other types of storage devices, or a combination thereof. As illustrated, arrays 132 and 142 each include fourteen storage devices, but other numbers of storage devices can be utilized as needed or desired. In a particular embodiment, storage network 100 is configured as a storage area network. Storage network 100 can operate as a local-area-network fabric such as an Ethernet network, a Fibre Channel network, or a wireless local-area-network, the storage network can operate as a wide-area-network such as an Internet, or a wide area wireless network, or the storage network can operate as a combination of local-area-networks and wide-area-networks.

Storage network 100 provides a high-availability, high-reliability storage capability. Array 132 and array 142 are each configured as a redundant array of independent drives (RAID) array. In a particular embodiment, arrays 132 and 142 are configured as RAID 4 arrays, each with a single distributed parity drive, such as parity data storage devices 134 and 144, respectively, and are each fault tolerant to a single device failure. Hot spare storage devices 136 and 146 can be configured such that, upon detection of a device failure, the data from the failing device is regenerated onto the hot spare storage devices. In another embodiment, arrays 132 and 142 are configured as RAID 5 arrays without a separate parity data storage devices 134 and 144, but with the parity information distributed between the individual storage devices of arrays 132 and 142. In another embodiment, arrays 132 and 142 are configured as RAID 6 arrays, each with a pair of distributed parity drives, and are each fault tolerant to a double device failure. Here, arrays 132 and 142 can each include a pair of hot spare storage devices 136 and 146 such that, upon detection of two device failures, the data from the failing devices is regenerated onto the pair of hot spare storage devices. In yet another embodiment, a different RAID configuration can be applied to arrays 132 and 142, as needed or desired. In another embodiment (not illustrated), storage arrays can be configured such that no particular storage device is a parity data storage device, but rather is configured such that the parity data for the array is striped across the storage devices of the array. In the RAID-plus-copy model, data that is stored on one of storage servers 130 or 140 is stored according to the RAID configuration of arrays 132 and 142, and the data is mirrored onto the other storage server.

FIG. 1 also illustrates a method of providing RAID-plus-copy storage on storage network 100. Data from information handling system 110 is sent to storage server 130 in operation 160. When storage server 130 receives the data, the storage server determines to write the data to a particular location on a particular storage device in array 132. Storage server 130 then reads the data from the particular location on the particular storage device and the parity data for the particular location from parity data storage device 134 in operation 162. Storage server 130 compares the received data with the data read from the particular location on the particular storage device in array 132, and calculates new parity data based upon the parity data from data parity storage device 134 in operation 164. Storage server 130 then writes the data received from information handling system 110 to the particular location on the particular storage device and writes the new parity data for the particular location to data parity storage device 134 in operation 166. The data is sent from storage server 130 to storage server 140 in operation 168, and the new parity data calculated by storage device 130 is sent to storage server 140 in operation 170. Storage server 140 then writes the data received from storage server 130 to the associated location on the associated storage device in storage array 132, and writes the new parity data received from storage server 130 to the associated location on data parity storage device 144 in operation 172.

The parity calculation illustrated in operation 164 is performed in accordance with the configuration of arrays 132 and 142. As such, if arrays 132 and 142 are in a RAID 5 configuration, the parity calculation operation 164 will be performed in a different manner than if arrays 132 and 142 are in a RAID 6 configuration, or in another RAID configuration. For example, if arrays 132 and 142 are in a RAID 5 configuration, then the data received from information handling system 110 in operation 160 is compared with the data read from the particular location on the particular storage device in operation 162. The comparison can be performed by execution of a logical XOR operation on the data received from information handling system 110 and the data read from the storage device. The result of the logical XOR operation is then used to process the parity data read from parity data storage device 134 in operation 162. The process can be performed by determining if a particular bit in the result of the logical XOR operation is a "0" or a "1". If the XOR-bit is a "0", then the associated bit in the parity data is unchanged. However, if the XOR-bit is a "1", then the associated bit in the parity data is inverted. Thus, if the XOR-bit is a "1" and the associated bit in the parity data is a "0," then the new parity bit is a "1." Similarly, if the XOR-bit is a "1" and the associated bit in the parity data is a "1," then the new parity bit is a "0."

Table 1 illustrates the computing resources utilized by the RAID-plus-copy model of FIG. 1, in the column labeled "Improved RAID+Copy." Here, there are three data transfers, illustrated by operations 160, 168, and 170, two data reads, illustrated by operation 162, four data writes, illustrated by operations 166 and 172, and one parity calculation, illustrated by operation 164. Further, Table 1 illustrates that the RAID-plus-copy model uses twenty-eight storage devices in combination to store twelve storage devices worth of data.

TABLE 1

Storage Models Compared

| | | Model | | | |
|---|---|---|---|---|---|
| | Data Mirroring | Conventional RAID + Copy | Difference | Improved RAID + Copy | Difference |
| Storage Servers | 3 | 2 | −33.33% | 2 | −33.33% |
| Storage Devices | 36 | 28 | −22.22% | 28 | −22.22% |
| Network Transactions per Write | 3 | 2 | −33.33% | 3 | 0.00% |
| Disk Accesses per Write | 3 | 8 | 167.67% | 6 | 100.00% |
| Parity Calculations per Write | 0 | 2 | N/A | 1 | N/A |

Table 1 also illustrates the computing resources utilized in implementing a data mirroring model of the prior art, in the column labeled "Data Mirroring," and illustrates the computing resources utilized in implementing a conventional RAID-plus-copy model, in the column labeled "Conventional RAID+Copy." In the data mirroring model, data that is stored on one storage server is duplicated on two or more other storage servers. In the data mirroring model, there are three data transfers, and three data writes, and 36 storage devices combine to store twelve storage devices worth of data. In a particular embodiment of the data mirroring model, an information handling system can send the data to the first storage server and the first storage server can send the date to the second and third storage servers. In another embodiment, the information handling system can send the data to the first storage server, the first storage server can send the data to the second storage server, and the second storage server can send the data to the third storage server. In yet another embodiment, the information handling system can send the date to the first, second, and third storage servers.

The conventional RAID-plus-copy model utilizes a storage network similar to storage network 100. However, in the conventional RAID-plus-copy model, after a first storage server writes data to a particular storage device and writes new parity data to a data parity storage device, the storage server sends only the data to the second storage server. Then the second storage server reads the old data and the old parity data, calculates new parity data, and finally writes the data and the new parity data. The conventional RAID-plus-copy model utilizes two data transfers, four data reads, four data writes, and two parity calculations, and 28 storage devices combine to store twelve storage devices worth of data. Finally, both the data mirroring model and the conventional RAID-plus-copy model are compared in Table 1 to the RAID-plus-copy model of the present disclosure.

As can be seen from Table 1, both the conventional RAID-plus-copy model and the improved RAID-plus-copy model provide a similar high-availability, high-reliability storage capability to the data mirroring model, but with fewer storage servers and fewer storage devices than are needed to implement the data mirroring model. The conventional RAID-plus-copy model also utilizes fewer network transactions per write than the data mirroring model. Both the conventional RAID-plus-copy model and the improved RAID-plus-copy model utilize more disk accesses and parity calculations than the data mirroring model, but the improved RAID-plus-copy model utilizes fewer disk accesses and parity calculations than the conventional RAID-plus-copy model. Thus, in data processing environments where computing resources within a server are relatively less expensive than servers and storage devices, the RAID-plus-copy models can provide a more cost effective storage solution, and the improved RAID-plus-copy model can be still more cost effective than the conventional RAID-plus-copy model.

In another embodiment (not illustrated), storage network 100 is a virtualized storage network. As such, information handling system 110 can represent one or more virtualized servers, each operating one or more virtual machines, and including a virtual machine manager, or hypervisor. Here, different virtual machines can share storage capacity on storage servers 130 and 140, and information handling system 110 can include a host bus adapter that provides access to the resources of the storage servers. The host bus adapter can be also be virtualized such that each virtual machine has a dedicated virtual host bus adapter. The various host bus adapters can function to provide data to storage servers 130 and 140 as described above. Moreover, storage servers 130 and 140 can represent virtualized storage capabilities, such that the individual storage devices in arrays 132 and 142 can be physical storage devices, such as disk drives, or can be virtual drives or partitions on a physical storage device. As such, the various virtual drives and physical devices associated with arrays 132 and 142 can be configured as RAID arrays as described above, and can provide the data storage functions as described above.

Figure 2:
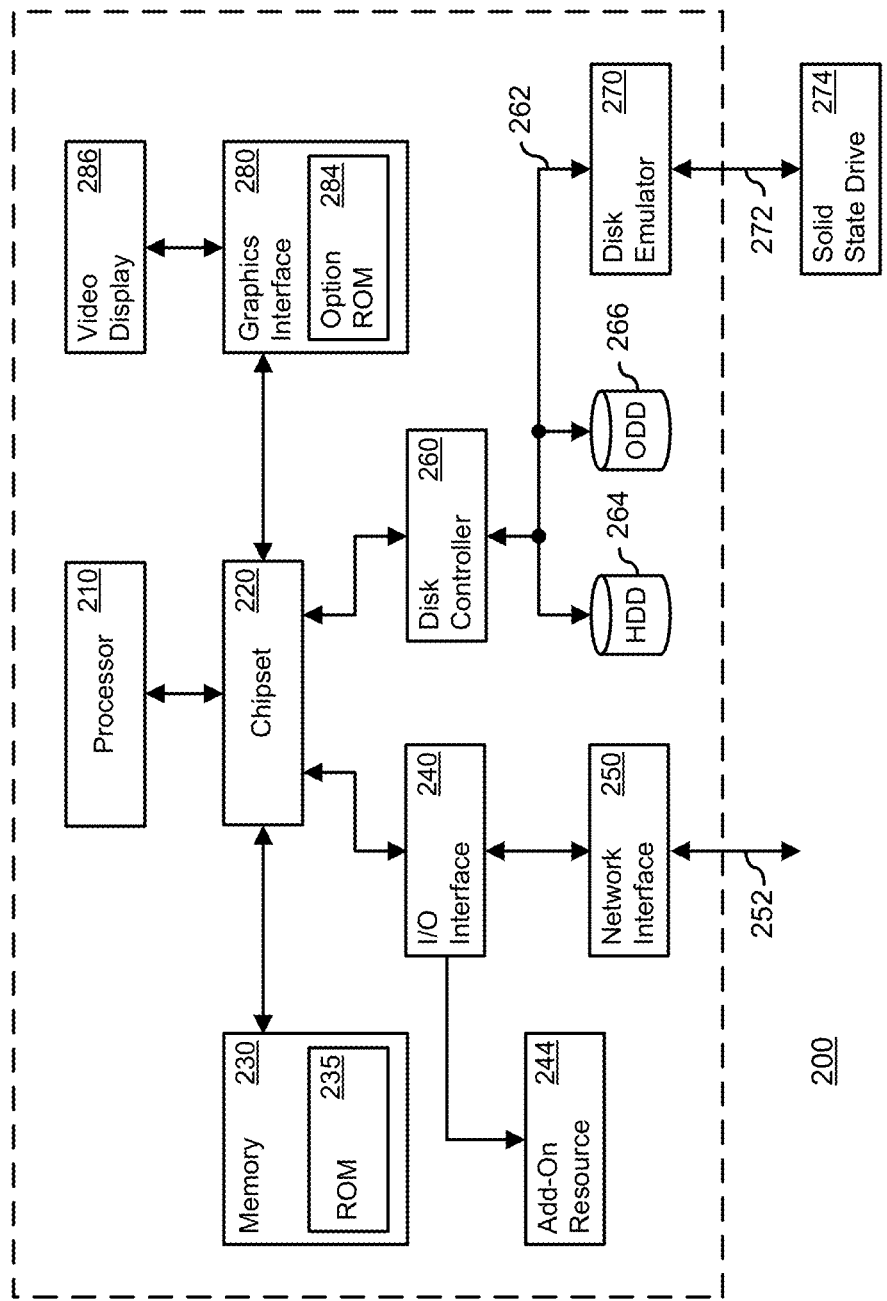
FIG. 2 is a functional block diagram illustrating an exemplary embodiment of an information handling system according to the present disclosure.

FIG. 2 shows an illustrative embodiment of an information handling system 200 in accordance with at least one embodiment of the present disclosure. Information handling system 200 can include a set of instructions that can be executed to cause it to perform any one or more of the methods or computer based functions disclosed herein. Information handling system 200 may operate as a standalone device or may be connected such as using a network, to other information handling systems or peripheral devices.

In a networked deployment, information handling system 200 can operate in the capacity of a server or as a client user computer in a server-client user network environment, or as a peer computer system in a peer-to-peer (or distributed) network environment. Information handling system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, information handling system 200 can be implemented using electronic devices that provide voice, video or data communication. Further, while a single information handling system 200 is illustrated, the term "system" shall also be taken to include any collection of systems or sub-systems that individually or jointly execute a set, or multiple sets, of instructions to perform one or more computer functions.

Information handling system 200 includes processor 210, a chipset 220, a memory 230, an input/output interface 240, a network interface 250, a disk controller 260, a disk emulator 270, and a graphics interface 290. Processor 210 is connected to chipset 220. Chipset 220 supports processor 210, allowing processor 210 to process machine-executable code. In a particular embodiment, information handling system 200 includes one or more additional processors, and chipset 220 supports the multiple processors, allowing for simultaneous processing by each of the processors, permitting the exchange of information between the processors and the other elements of information handling system 200. Processor 210 can be connected to chipset 220 via a unique channel, or via a bus that shares information between processor 210, chipset 220, and other elements of information handling system 200.

Memory 230 is connected to chipset 220. Memory 230 can be connected to chipset 220 via a unique channel, or via a bus that shares information between chipset 220, memory 230, and other elements of information handling system 200. In particular, a bus can share information between processor 210, chipset 220 and memory 230. In a particular embodiment, processor 210 is connected to memory 230 through a unique channel. In accordance with another aspect, an information handling system can include a separate memory dedicated to each of the processors. A non-limiting example of memory 230 includes static, dynamic, or non-volatile random access memory (SRAM, DRAM, or NVRAM), another type of memory, or any combination thereof. Memory 230 includes read-only memory (ROM) 235. A non-limiting example of ROM 235 includes NVRAM, erasable-programmable ROM (EPROM), flash memory, another type of read-only memory, or any combination thereof. ROM 235 includes basic input/output system (BIOS) code that is executed during the bootstrap process of information handling system 200 to initialize the various elements of the information handling system, and during operation to process various I/O operations for the information handling system. One function of the BIOS code is to execute a memory reference code during the bootstrap process that initializes and tests memory 230.

I/O interface 240 is connected to chipset 220. I/O interface 240 can be connected to chipset 220 via a unique channel, or via a bus that shares information between chipset 220, I/O interface 240, and other elements of information handling system 200. Other I/O interfaces can also be used in addition to I/O interface 240 if needed or desired. I/O interface 240 is connected to one or more add-on resources 244. Add-on resource 244 can also include another data storage system, a graphics interface, a network interface card (NIC), a sound/video processing card, another suitable add-on resource or any combination thereof.

Network interface device 250 is connected to I/O interface 240. Network interface 250 can be connected to I/O interface 240 via a unique channel, or via a bus that shares information between I/O interface 240, network interface 250, and other elements of information handling system 200. Other network interfaces can also be used in addition to network interface 250 if needed or desired. Network interface 250 can be a NIC disposed within information handling system 200, on a main circuit board (e.g., a baseboard, a motherboard, or any combination thereof), integrated onto another component such as chipset 220, in another suitable location, or any combination thereof. Network interface 250 includes a network channel 252 that provides an interface between information handling system 200 and other devices that are external to information handling system 200. In a particular embodiment, network interface 250 includes additional network channels.

Disk controller 260 is connected to chipset 210. Disk controller 260 can be connected to chipset 220 via a unique channel, or via a bus that shares information between chipset 220, disk controller 260, and other elements of information handling system 200. Other disk controllers can also be used in addition to disk controller 260 if needed or desired. Disk controller 260 can include a disk interface 262. Disk controller 260 can be connected to one or more disk drives via disk interface 262. Such disk drives include a hard disk drive (HDD) 264, an optical disk drive (ODD) 266 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 260 is connected to disk emulator a170. Disk emulator a170 permits a solid-state drive a174 to be connected to information handling system 200 via an external interface 272. The external interface can include industry standard busses (e.g., USB or IEEE 1384 (Firewire)) or proprietary busses, or any combination thereof. Alternatively, solid-state drive a174 can be disposed within information handling system 200.

Graphics interface 280 is connected to chipset 220. Graphics interface 280 can be connected to chipset 220 via a unique channel, or via a bus that shares information between chipset 220, graphics interface 280, and other elements of information handling system 200. Graphics interface 280 is connected to a video display 286. Other graphics interfaces can also be used in addition to graphics interface 280 if needed or desired. Video display 286 can include one or more types of video displays, such as a flat panel display or other type of display device. In a particular embodiment, video display 286 is provided remotely from information handling system 200, such as when information handling system is part of a server system that is remotely managed. Graphics interface 280 includes an option ROM 284 that includes firmware code that is executed during the bootstrap process of information handling system 200 to initialize graphics interface 280, and during operation to process video information for display on video display 286.

In a particular embodiment, one or more of memory 230, flash memory 235, HDD 264, ODD 266, solid state drive 274, option ROM 284, or a combination thereof provide a computer-readable medium for storing one or more sets of machine-executable instructions such as software. For example, the machine-executable instructions, or code, can embody one or more of the methods or logic as described herein. In a particular embodiment, the machine-executable instructions are embedded completely, or at least partially, within processor 210, memory 230, flash memory 235, HDD 264, ODD 266, solid state drive 274, option ROM 284, or a combination thereof, and can be executed by processor 210. As such, processor 210, memory 230, flash memory 235, HDD 264, ODD 266, solid state drive 274, and option ROM 284 can include computer-readable media. Information handling system 200 can be used to function as a system described below, or can function to carry out one or more of the methods described below.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A storage system comprising:
    a first storage server including a first redundant array of independent drives (RAID) array, wherein the first RAID array comprises a plurality of virtual partitions on a physical storage device; and
    a second storage server including a second RAID array that mirrors the first RAID array;
    wherein the first storage server is adapted to:
        receive first data;
        read second data from the first RAID array, wherein the second data is associated with the first data;
        read first stored parity data from the first RAID array, wherein the first stored parity data is associated with the second data, and wherein the first stored parity data is striped across the first RAID array;
        determine first parity data for the first RAID array based upon the first data, the second data, and the first stored parity data;
        store the first data and the first parity data in the first RAID array; and
        send the first data and the first parity data to the second storage server; and
    wherein the second storage server is adapted to:
        receive the first data and the first parity data from the first storage server; and
        directly store the first data and the first parity data in the second RAID array without separately determining the first parity data.

2. The storage system of claim 1, wherein the first parity data is stored in a first parity block of the first RAID array.

3. The storage system of claim 2, wherein the first stored parity data is stored in the first parity block prior to receiving the first data.

4. The storage system of claim 1, wherein, in determining the first parity data, the first storage server is further adapted to:
  determine a location in the first RAID array to store the first data;
  read the second data from the location in the first RAID array; and
  determine the first parity data based upon an XOR operation of the first data and the second data.

5. The storage system of claim 1, wherein the first RAID array comprises a plurality of storage devices.

6. The storage system of claim 5, wherein a particular storage device of the plurality of storage devices comprises a hot spare storage device.

7. A method for storing data on a storage system, comprising:
  receiving first data at a first redundant array of independent drives (RAID) array, wherein the first RAID array comprises a hot spare storage device;
  reading second data from the first RAID array, wherein the second data is associated with the first data;
  reading first stored parity data from the first RAID array, wherein the first stored parity data is associated with the second data, and wherein the first stored parity data is striped across the first RAID array;
  determining first parity data for the first RAID array based upon the first data, the second data, and the first stored parity data;
  storing the first data and the first parity data in the first RAID array;
  sending from the first RAID array to a second RAID array the first data and the first parity data, wherein the second RAID array is configured to provide RAID-plus-copy mirroring of the first RAID array;
  receiving at the second RAID array the first data and the first parity data;
  directly storing at the second RAID array the first data and the first parity data without separately determining the first parity data;
  detecting a device failure in the first RAID array; and
  regenerating data from the failing device onto the hot spare storage device.

8. The method of claim 7, wherein the first parity data is stored in a first parity block of the first RAID array.

9. The method of claim 8, wherein the first stored parity data is stored in the first parity block prior to receiving the first data.

10. The method of claim 7, wherein, determining the first parity data further comprises:
  determining a location in the first RAID array to store the first data;
  reading the second data from the location in the first RAID array; and
  determining the first parity data based upon an XOR operation of the first data and the second data.

11. The method of claim 7, wherein the first RAID array comprises a plurality of storage devices.

12. Machine-executable code for an information handling system, wherein the machine-executable code is embedded within a non-transitory medium and includes instructions for carrying out a method, the method comprising:
  receiving first data at a first redundant array of independent drives (RAID) array, wherein the first RAID array comprises a hot spare storage device;
  reading second data from the first RAID array, wherein the second data is associated with the first data;
  reading first stored parity data from the first RAID array, wherein the first stored parity data is associated with the second data, and wherein the first stored parity data is striped across the first RAID array;
  determining first parity data for the first RAID array based upon the first data, the second data, and the first stored parity data;
  storing the first data and the first parity data in the first RAID array;
  sending from the first RAID array to a second RAID array the first data and the first parity data, wherein the second RAID array is configured to provide RAID-plus-copy mirroring of the first RAID array;
  receiving at the second RAID array the first data and the first parity data;
  directly storing at the second RAID array the first data and the first parity data without separately determining the first parity data;
  detecting a device failure in the first RAID array; and
  regenerating data from the failing device onto the hot spare storage device.

13. The machine-executable code of claim 12, wherein:
  the first parity data is stored in a first parity block of the first RAID array; and
  the first stored parity data is stored in the first parity block prior to receiving the first data.

14. The machine-executable code of claim 12, wherein, in determining the first parity data, the method further comprises:
  determining a location in the first RAID array to store the first data;
  reading the second parity data from the first RAID array; and
  determining the first parity data based upon an XOR operation of the first data and the second data.

15. The machine-executable code of claim 12, wherein the first RAID array comprises a plurality of storage devices.

* * * * *